United States Patent [19]

Rayas et al.

[11] Patent Number: 5,472,511
[45] Date of Patent: Dec. 5, 1995

[54] METHOD FOR THE SEPARATION OF PROTEINS FROM GRAIN FLOUR

[75] Inventors: Luis M. Rayas; Perry K. W. Ng, both of East Lansing, Mich.

[73] Assignee: Board of Trustees operating Michigan State University, East Lansing, Mich.

[21] Appl. No.: 272,555

[22] Filed: Jul. 11, 1994

[51] Int. Cl.$^6$ ............ C08B 30/00; C08B 30/12; C13F 3/00; A23J 1/00
[52] U.S. Cl. ............ 127/67; 127/70; 127/71; 127/29; 127/32; 127/33; 530/412; 530/424; 530/427
[58] Field of Search ............ 127/67, 70, 71, 127/29, 32, 33; 530/412, 424, 427

[56] References Cited

U.S. PATENT DOCUMENTS

| | | | |
|---|---|---|---|
| 2,233,439 | 3/1941 | Wahlforss et al. | 134/12 |
| 2,377,853 | 6/1945 | Boyer et al. | 260/112 |
| 3,023,107 | 2/1962 | Mustakas et al. | 530/424 |
| 3,493,384 | 2/1970 | Fellers | 99/2 |
| 3,498,965 | 3/1970 | Fellers | 260/112 |
| 3,501,451 | 3/1970 | Fellers | 260/112 |
| 3,542,754 | 11/1970 | Fellers | 260/112 |
| 3,574,180 | 4/1971 | Johnston et al. | 260/112 |
| 3,653,925 | 4/1972 | Anker et al. | 99/166 |
| 3,951,938 | 4/1976 | Kerkkonen et al. | 260/112 |
| 4,089,848 | 5/1978 | Bell et al. | 260/112 R |
| 4,132,566 | 1/1979 | Verberne et al. | 127/65 |
| 4,465,702 | 8/1984 | Eastman et al. | 426/578 |
| 4,494,530 | 1/1985 | Jansma et al. | 127/69 |
| 4,675,387 | 6/1987 | Korant | 530/412 |
| 5,057,157 | 10/1991 | Jane et al. | 127/70 |
| 5,112,956 | 5/1992 | Tang et al. | 530/424 |
| 5,364,471 | 11/1994 | Czuchajowska et al. | 127/65 |

OTHER PUBLICATIONS

Gennadios et al., Food Tech., 44 (10):63 (1990) Oct. 1990.
Krull et al., Industrial uses of gluten, Cereal Science Today, 16(8):232 (1971) Aug. 1971.
Gennadios et al., J. Food Sci., 58(1):212 (1993) (month not available).
Gontard et al., J. Food Sci. 57(1):190 (1992) month not available.
Magnuson, K. M., Cereal Food World, 30(2):17 (1985) Feb. 1985.
Gontard et al., J. Food Sci., 58(1):206 (1993) (month not available).

*Primary Examiner*—Paul Lieberman
*Assistant Examiner*—Patricia L. Hailey
*Attorney, Agent, or Firm*—Ian C. McLeod

[57] ABSTRACT

A process wherein a grain flour is treated to remove proteins is described. The process uses ethanol and water for the extraction at acid or basic pH's and optionally heating with or without a reducing agent. The remaining solution is then used to form edible and biodegradable films by casting on a surface.

33 Claims, No Drawings

METHOD FOR THE SEPARATION OF PROTEINS FROM GRAIN FLOUR

BACKGROUND OF THE INVENTION

1. Field of the Invention

The present invention relates to edible and/or biodegradable films and coatings, and their mode of preparation. More specifically, the present invention relates to the preparation and methods of film-forming solutions directly from wheat flour. The film-forming solutions in this invention yield homogeneous, inexpensive, ameliorated edible and/or biodegradable films and coatings. There are significant uses for them in industry, especially in the food areas.

2. Description of Related Art

There are currently many polymer films used in industry. Although recycling programs have been developed, there is still a lot of waste of these single use products. Pollution by their very low degradation potential has elicited significant concern in the industry, government, and ecological groups.

Edible and/or biodegradable films and coatings have been developed using polymeric materials such as proteins (U.S. Pat. No. 3,653,925, to Anker et al, issued Apr. 28, 1972). There is currently limited applications of these films in the industry because of their poor water barrier and mechanical properties, as explained by Gennadios and Weller (Gennadios et al., Food Tech., 44(10):63 (1990)) and Krull and Inglett (Krull et al., Industrial uses of gluten, Cereal Science Today, 16(8):232 (1971)). In the development of edible and/or biodegradable films and coatings in which protein is used as the primary polymeric material, most of the current methods developed are based on U.S. Pat. No. 3,653,925, to Anker et al. This U.S. patent approaches the preparation of the film or coating by using dried wheat gluten (powder), available commercially or easily fabricated in a laboratory by various methods. In this case, vital wheat gluten (see AACC Method 38-20), which is a powder made from whole gluten, is rehydrated and a film-forming solution is formed after combination with other compounds. Examples of these methods include those by Gennadios et al (Gennadios et al., J. Food Sci., 58(1):212 (1993)), Gontard et al (Gontard et al., J. Food Sci., 58(1):206 (1993)), Gontard et al (Gontard et al., J. Food Sci., 57 (1):190 (1992)), Gennadios and Weller (Gennadios et al., Food tech., 44(10):63 (1990)), and Magnuson (Magnuson, K. M., Cereal Food World 30(2):17 (1985)). Another method of preparation is based on using whole gluten, as explained by Krull and Inglett (Krull et al., Industrial uses of gluten, Cereal Science Today., 16(8): 232 (1971)).

There have been some approaches to separating gluten and starch from wheat flour (U.S. Pat. Nos. 4,494,530 issued Jan. 22, 1985 to Jansma et al; No. 4,132,566 issued Jan. 2, 1979 to Verberne et al; 3,951,938 issued Apr. 20, 1976 to Kerkkonen et al; 3,574,180 issued Apr. 6, 1971 to Johnston et al; 3,542,754 issued Nov. 24, 1970 to Fellers; 3,501,451 issued Mar. 17, 1970 Fellers; 3,498,965 issued Mar. 3, 1970 to Fellers and 3,493,384 issued Feb. 3, 1970 to Fellers). The disadvantage of some of these processes is that the protein concentrates yielded are not designed as film-forming solutions, but as protein supplements in some foods, e.g. breads, animal feeds, base for preparing milk-like beverages and the like. In other methods the objective is to prepare vital gluten powders once the solution is dried and pulverized. Finally, other methods are interested only in the separation of starch and protein from the flour.

OBJECTS

It is an object of the present invention to provide a novel method for the separation of proteins from grain, particularly wheat. It is further an object of the present invention to provide films from the proteins produced by the method which are relatively strong, biodegradable and/or edible. Further, it is an object of the present invention to provide a method which is economical and easy to perform. These and other objects will become increasingly apparent by reference to the following description.

DESCRIPTION OF PREFERRED EMBODIMENTS

The present invention relates to a process for separation of proteins in a grain flour which comprises: mixing the flour containing the proteins and the starch with water containing between about 50 and 95% ethanol at a pH which causes the proteins to be solubilized in the solution and so that the starch is essentially insoluble in the solution; and centrifuging the solution to separate the starch from the solution; removing the protein-containing solution from the starch; optionally heating the solution at a temperature between about 30° C. and a boiling point of the solution to concentrate the solution and denature the proteins. The pH can be acidic or basic.

The present invention thus relates to a new and practical process for preparing edible and/or biodegradable film-forming solutions. This invention also relates to the films and coatings resulting from the film-forming solution.

The form of preparation of the film-forming solution has commercial appeal for several reasons. No initial steps of separation of gluten from flour and drying of that gluten are necessary, thus a lower energy cost is achieved. The total flour proteins obtained in the solution are the primary products. The materials and reagents necessary for the process operation are inexpensive. There is potential for total recovery of products in the process path, that is, starch can be recovered in the precipitate after the centrifugation process; the solvent solution when evaporated in the concentration step of the film-forming solution can also be recovered by condensation. The solution has a high protein content, which is increased when evaporation of the solvent is performed. The heating of the solution is necessary in order to denature the native structure of the flour proteins and to promote the interaction of protein chains among each other and improve the resulting mechanical properties of the edible and/or biodegradable film.

The preferred grain flour is wheat flour. Other flours which can be used are corn flour, barley flour, rice flour and other grain flours.

The acids which can be used to adjust the pH are for instance acetic acid, lactic acid and sulfuric acid and other edible acids. Acetic acid is preferred.

The bases which can be used to adjust the pH are for instance sodium hydroxide and ammonium hydroxide. Sodium hydroxide is preferred.

The films are cast on a surface using the solution remaining after heating and then the film is removed from the surface.

The films can have any shape when the film-forming solution is used to produce coatings, while an inert flat surface is required when films are the product of intention. Parting agents can be used to facilitate removal of the film.

It has been particularly discovered that edible and/or biodegradable film-forming solutions can be obtained directly from wheat flour. Any type of wheat flour, i.e. soft, hard, blends, and the like can be used to produce film-forming solutions. Based on the initial flour quantity employed, soft wheat flour, because of its generally lower protein content produced film-forming solutions that yielded films with inferior mechanical properties. On the other hand, hard wheat flour, known for its high protein content, resulted in films with better mechanical properties.

During the preparation of the slurry with the flour, the addition of alcohol into the solution is necessary in order to dissolve the gliadin fraction of the flour proteins. The alcohol used in this invention is ethanol, which is inexpensive and has been shown to effectively solubilize the gliadin fraction of flour proteins. The ethanol is found to dissolve the gliadin fraction efficiently when added in concentrations between 50 and 95 percent with respect to water. At concentrations lower than 50 percent, the film-forming solution yields non-continuous films or coatings and the drying process time in the film is increased because of the lower volatility of the water present in greater amount. At concentrations of more than 95 percent, the film-forming solution does not contain all of the protein that can be extracted thus yielding films with lower protein content.

This invention requires that the solution contain an acid or a base. Either of these will help in solubilizing the glutenin fraction in the film-forming solution. The acid-containing solutions yield light-yellow transparent films while the ones obtained using a base are yellowish translucent in appearance. The acid used in this invention is preferably acetic acid, which is a volatile acid that can be recovered when the film is dried. When using an acid, this is added in quantities such that the final pH of the film-forming solution is about 4 with a range of 3 to 6. At pH below 3 the films obtained from the film-forming solution in this invention have poor properties while the films obtained at pH greater than 6 are not homogeneous nor easily handled.

The preferred method in which a base is used includes sodium hydroxide or ammonium hydroxide. Sodium hydroxide is a non-volatile base that will remain in the film. Ammonium hydroxide is a volatile base that will evaporate when the film is being dried. The final pH of the film-forming solution when using a base is in the range of 10 to 12, with an optimum pH of 11. Below pH 10 the film-forming solution will yield sticky films difficult to manage while above pH 12 the films do not form.

Centrifugation of the acid or base slurry solution obtained is necessary and the most important step in order to achieve separation of the starches from the protein solution, thus obtaining the film-forming solution. The relative centrifugal force (RCF), "g", in this invention is greater than 1000×g. Good separation with shorter time is achieved when RCF is 27500×g for 10 minutes. Lower RCF than 1000×g require longer periods of time to obtain good separation which increases costs of operation.

A heating process is preferred in order to concentrate the film-forming solution and denature the flour proteins so that more protein interactions occur when the film is dried and stronger films are formed. The heating process in this invention must be in the range of 30° C. up to the boiling point of the solution, with a preferred range of 60° C. up to the boiling point. This is in order to get the unfolding of the protein molecules to form stronger films and/or coatings. In the evaporation process the volatiles can be recovered by condensation and re-used by adjusting the content of the solution components. When a heating process is used, it can be stopped after the coldest point in the solution reaches the desired temperature, i.e., after at least 5 minutes if the temperature is 60° C. or immediately when the solution starts to boil. This is done to ensure that the protein unfolding occurs. Vacuum can be applied to solutions warmed below the boiling point in order to volatilize the solvent and concentrate the film-forming solution. When no or minimal volatilization (evaporation) of the solvent from the film-forming solution is performed, the films obtained from the film-forming solutions are very thin when poured on an inert flat surface (e.g., glass, PLEXIGLAS and the like), as compared with volatilized film-forming solutions which produce thicker films when poured on the same surface. Also, when no or minimal volatilization of the solvent from the film-forming solution is performed, the film-forming solution can be poured into a container having an inert flat surface. The container is allowed to dry under controlled temperature, preferably above 35° C. so that evaporation of the solvent occurs between 10 to 48 hours, and then the film is peeled off the surface. The total evaporated solvent from the film-forming solution prior to casting of the film in this invention is from zero to 90%. More than 90% of the solvent evaporated prior to casting yields film-forming solutions difficult to manage and increases the process energy required to volatilize the remaining solvent. This is due to interactions of the solvent within the biopolymer structure. Evaporation of 75% of the solvent from the film-forming solution yields film-forming solutions which are easy to handle, e.g., pour and spread, thus increasing processability.

Polyols, preferably glycerol (glycerin) are added to the film-forming solution so that it yields non-brittle films and/or coatings. The amount of polyol is based on the total initial flour weight, so that it is 3% (w/w), preferably with a range from 1 to 5% of the flour weight or a range from 8 to 45% (w/w) in the final film. This addition to the film-forming solution is done preferably at the stage just before the film casting process. If the glycerol is added prior to that, it binds some of the solvent molecules in the solution and increases the evaporation time, thus increasing operation costs. Addition of more than 5% (w/w) polyol based upon the flour weight into the film-forming solution yields sticky films and/or coatings difficult to manage and poorer in barrier properties than films obtained with a lower polyol concentration. An amount lower than 1% (w/w) polyol used in the film-forming solution produces films and/or coatings that are brittle and break easily over a small period of time. Other additives which function as film modifiers can be incorporated into the film-forming solution prior to casting the films. This is done by adding them while the film-forming solution is still warm and requires stirring. It is most preferred that the additives be introduced at this stage because of the possibility of loss during the evaporation process or their alteration during the heating process itself during the required time of intense heating.

A reducing agent is preferably used to reduce the disulfide bonds in the proteins. This lowers the molecular weight of the proteins and provides good films. Any reducing agent can be used. Cysteine, sulfur dioxide or sodium bisulfite can be used in edible films as reducing agents.

The process and the products of this invention are further demonstrated by the following illustrative examples.

EXAMPLE 1

Example 1 shows the use of a low pH for the protein extraction.

To 100 g of commercial wheat bread flour containing 14.1% protein, 300 ml of 70% ethanol was added. Mixing was carried out until a slurry was formed. The pH of the slurry was adjusted to 4.0 with acetic acid while continuously mixing. The adjusted slurry was centrifuged at 16,200×g for 10 minutes. The supernatant was boiled while stirring until about ¼ of the initial liquid remained, at which point 2.0 g of glycerol was added to the concentrated liquid. The warm mixture was cast on an inert flat surface (glass) using a thin layer chromatography spreader apparatus set to 0.75 mm thickness. The film was dried at room temperature for 48 hours. After drying, the film was easily removed from the surface. The dried film weighed 7.6 g, was transparent, yellowish, flexible, strong, and had a thickness of 5.5 mil.

EXAMPLE 2

Example 2 is like Example 1 with a different film thickness.

To 100 g of commercial all-purpose flour with 12.3% protein, 300 ml of 70% ethanol was added. Mixing was carried out until a slurry was formed. The pH of the slurry was adjusted to 4.0 with acetic acid while continuously mixing. The slurry was centrifuged at 16,200×g for 10 minutes. The supernatant was removed and boiled while stirring until about ¼ of the initial liquid remained, at which point 2.1 g of glycerol was added to the concentrated liquid. The warm mixture was cast on an inert flat surface (glass) using a thin-layer chromatography spreader apparatus set to 0.75 mm thickness. The film was dried at room temperature for 48 hours. After drying, the film was easily removed from the surface. The dried film weighed 7.3 g, was transparent, yellowish, flexible, strong, and had a thickness of 3.0 mil.

EXAMPLE 3

Example 3 is like Examples 1 and 2 with a smoother film thickness.

To 100 g of commercial cake flour with 8.8% protein, 300 ml of 70% ethanol was added. Mixing was carried out until a slurry was formed. The pH of the slurry was adjusted to 4.0 with acetic acid while continuously mixing. The slurry was centrifuged at 16,200×g for 10 minutes. The supernatant was removed and boiled while stirring until about ¼ of the initial liquid remained at which point 2.1 g of glycerol was added to the concentrated liquid. The warm mixture was cast on an inert flat surface (glass) using a thin-layer chromatography spreader apparatus set to 0.75 mm thickness. The film was dried at room temperature for 48 hours. After drying, the film was easily removed from the surface. The dried film weighed 6.0 g, was transparent, yellowish, flexible, strong, and had a thickness of 2.5 mil.

The preceding Examples 1 to 3 show that very thin films can be formed by the method of the present invention.

EXAMPLE 4

Example 4 shows the results with a higher "g", a higher amount of flour, a base and the addition of glycerol before centrifugation.

To 250 g of a commercial soft wheat flour with 8.8% protein, 600 ml of 70% ethanol was added. Stirring was carried out until a slurry was formed at which point 12 g glycerol was added in and mixed. The pH of the slurry was adjusted to 11.0 using 6N NaOH. The adjusted slurry was centrifuged at 27,500×g for 60 minutes and the resulting supernatant was then poured into a beaker to a 7.6 mm height and placed into an oven at 60° C. for 48 hours. The film could be removed easily from the flat surface. The dried film was transparent, yellowish, flexible, elastic, strong, and had a thickness of 7.5 mil.

EXAMPLE 5

Example 5 shows the effect of a base, room temperature drying, and pouring of the solution on a glass surface.

To 250 g commercial soft wheat flour with 8.8% protein content, 600 ml of 70% ethanol was added. While stirring, 12 g of glycerol was added after which the pH of the solution was adjusted to 11.0 with 6N NaOH. The mixture was centrifuged at 27,500×g for 30 minutes. The supernatant was boiled until about ¼ of the initial volume of the solution remained. The solution was then poured directly on a flat inert surface (glass) and was allowed to dry for 24 hours at room temperature. The dried film was transparent, yellowish, strong, flexible and had a thickness of 8.3 mil.

EXAMPLE 6

Example 6 shows the results with a base, a lower "g" and glycerol.

To 250 g commercial soft wheat flour with 8.8% protein, 600 ml of 70% ethanol was added. The pH of the mixture was adjusted to 11.0 with 6N NaOH. The mixture was centrifuged at 16,250×g for 20 minutes. The supernatant was boiled until ¼ of the initial volume remained at which point 4.5 g glycerol was added. The solution was cast on an inert flat surface (glass) with a thin layer chromatography spreader set at 0.5 mm. The film was allowed to dry at room temperature for 24 hours and then peeled off of the glass surface. The dried film was flexible, yellowish, translucent, strong, and had a thickness of 4.5 mil.

EXAMPLE 7

Example 7 shows the results with a lower heating temperature and a higher amount of glycerol than in Example 6.

To 150 g commercial all-purpose flour with 12.3% protein, 360 ml of 70% ethanol was added and stirred until a slurry was formed, at which point 7.2 g glycerol was added and mixing continued for another 10 minutes. The pH of the mixture was adjusted to 11.0 with 6N NaOH. The adjusted mixture was centrifuged at 16,250×g for 15 minutes after which the supernatant was heated to 82° C. and maintained at this temperature until about ¼ of the initial solution remained. The concentrated solution was cast on a glass surface and spread with a thin-layer chromatography spreader set at 0.75 mm thickness. The film was allowed to dry at room temperature for 24 hours and then peeled off of the glass surface. The film obtained was translucent, yellowish, strong, and flexible.

EXAMPLE 8

Example 8 shows the results with the use of a reducing agent, cysteine.

To 150 g commercial bread flour with 14.1% protein, 360 ml of 70% ethanol was added. The pH of the mixture was adjusted to 11.0 with 6N NaOH, then 14.4 ml of 0.1M cysteine was added. The mixture was stirred for 15 minutes, centrifuged at 16,200×g for 15 minutes after which 7.2 g glycerol was added to the supernatant. The solution was heated to 84° C. and maintained at this temperature until ¼ of the initial volume remained. The concentrated solution was cast on a flat inert surface (glass) and spread with a thin-layer chromatography spreader set at 0.75 mm thickness. The dried film was then peeled off of the glass surface. The film was transparent, yellowish, strong, flexible. It weighed 19 g, had a thickness of 8.4 mil, and was smooth on the bottom and ridged on the top.

EXAMPLE 9

Example 9 particularly shows that the process of the present invention does not solubilize the starch component of the grain flour which is a characteristic of U.S. Pat. No. 5,057,157 to Jane et al.

To 250 g of flour, 1000 ml of 0.5M NaCl solution was added and the slurry was stirred for 2 hours at refrigeration temperature (4° C.). The slurry was placed in centrifuge bottles and centrifuged at 20,000×g for 30 minutes. The resulting supernatant was decanted. The same steps were repeated using the precipitate. The two supernatants were combined and kept at refrigeration temperature.

The precipitate was then washed with 1000 ml water by stirring for 60 minutes at refrigeration temperature (4° C.), centrifuged at 20,000×g for 30 minutes, and the supernatant was decanted and added to the mixture of the first two supernatants (supernatant "A"). This mixture contained mainly the albumin and globulin fractions of the flour proteins.

The precipitate was further mixed with 1000 ml of 70% ethanol for 90 minutes at refrigeration temperature and centrifuged as above. This step was repeated a second time with the same conditions. Both supernatants in this step were mixed together (supernatant "B"). This mixture contained mainly the gliadin fraction of the flour proteins.

The precipitate was then mixed for 90 minutes with 1000 ml 0.05M acetic acid solution at refrigeration temperature and centrifuged as above. This step was repeated a second time with the same conditions. Both supernatants in this step were mixed together (supernatant "C"). This mixture contained mainly the acid-extractable glutenin fraction of the flour proteins.

The precipitate was then mixed with 1000 ml of 0.05 M acetic acid containing 1 mM dithiothreitol (DTT). Mixing was done at room temperature for 60 minutes and the slurry was centrifuged as above. This step was repeated a second time and the supernatants in this step were mixed together (supernatant "D"). This mixture contained mainly the acid-unextractable glutenin fraction of the flour proteins.

Supernatants B, C, and D were evaporated separately at atmospheric pressure until about 500 ml of solution remained for each at which point they were mixed together. The pH of the mixed solution was adjusted to 4.0 using 6N NaOH (initial pH = 3.88), and 7.2 g of glycerol was added. Evaporation at atmospheric pressure of the adjusted solution followed until about 150 ml of the volume remained. The concentrated solution was cast on an inert flat surface (glass) using a thin layer chromatography spreader set to 0.75 mm thickness. The film was dried at room temperature for 48 hours. The dried film was transparent, strong, flexible, and with a thickness of 5.5 mil.

Protein contents of the precipitates, mainly starch, from the steps after decanting supernatants "C" and "D" were 0.34% (db) and 0.27% (db), respectively, analyzed by micro-Kjeldahl method. These values were similar to those obtained for commercial wheat starch (0.33%). The cold water solubility (CWS) was measured according to Eastman et al (U.S. Pat. No. 4,465,702), and gave a value of 0.40% CWS, similar to the 0.79% CWS value for commercial wheat starch.

It is intended that the foregoing description be only illustrative of the present invention and that the present invention be limited only to the hereinafter appended claims.

We claim:

1. A process for separation of proteins in a grain flour which consists essentially of the steps of:

(a) mixing the flour containing essentially of the proteins and starch with water containing between about 50 and 95% ethanol, based on the total amount of water and ethanol, as a solution at a pH which causes the proteins to be solubilized in the solution selected from the group consisting of about pH 3 to 6 in the presence of an acid selected from the group consisting of acetic, lactic, and sulphuric acids, and so that the starch is essentially insoluble in the solution; and (b) centrifuging the solution to separate the starch from the solution;

(c) removing the solution from the starch; and (d) optionally heating the solution at a temperature between about 30° C. and a boiling point of the solution to concentrate the solution, wherein the proteins can be formed into a film from the solution.

2. The process of claim 1 wherein the solution in step (a) contains a base and has the pH which is between about 10 and 12.

3. The process of claim 2 wherein the base is an alkali metal base.

4. The process of claim 3 wherein the alkali metal base is an alkali metal hydroxide.

5. The process of claim 4 wherein the alkali metal hydroxide is sodium hydroxide.

6. The process of claim 1 wherein the solution contains an acid and has the pH which is between about 3 and 6.

7. The process of claim 6 wherein the acid is acetic acid.

8. The process of claim 1 wherein the centrifuging is at between about 1,000 and 30,000 times gravity.

9. The process of claim 1 wherein in addition the proteins are removed from the solution.

10. The process of claim 9 wherein the proteins are separated from the ethanol and water as a film.

11. The process of claim 10 wherein ethanol and some of the water are evaporated from the proteins to form a remaining solution, a plasticizer is added to the remaining solution and then a film is formed from the remaining solution by further removal of water from the remaining solution.

12. The process of claim 11 wherein the plasticizer is a polyhydric alcohol.

13. The process of claim 12 wherein the polyhydric alcohol is glycerol.

14. The process of claim 1 wherein in step (c) the solution is removed by being decanted from the starch.

15. The process of claim 1 wherein in step (d) there is the heating and wherein the protein in step (d) is treated with a reducing agent.

16. The process of claim 15 wherein the reducing agent is selected from the group consisting of cysteine, sulfur dioxide and sodium bisulfite.

17. The process of claim 15 wherein the ethanol and some of the water are evaporated from the proteins to form a remaining solution, a plasticizer is added to the remaining solution and then a film is formed from the remaining solution by removal of further water.

18. The product of the process of claim 1 as a film.

19. The product of the process of claim 11 as the film.

20. The product of the process of claim 17 as the film.

21. A process for separation of proteins in a grain flour which comprises:
  (a) mixing the flour containing the proteins and starch with water containing between about 50 and 95% ethanol as a solution at a pH which causes the proteins to be solubilized in the solution and so that the starch is essentially insoluble in the solution; and
  (b) centrifuging the solution to separate the starch from the solution;
  (c) removing the proteins containing solution from the starch;
  (d) heating the solution at a temperature between about 30° C. and a boiling point of the solution to remove ethanol and some of the water to form a remaining solution;
  (e) adding a plasticizer to the remaining solution; and
  (f) forming a film by removal of water from the remaining solution.

22. The process of claim 21 wherein the solution in step (a) contains a base and has the pH which is between about 10 and 12.

23. The process of claim 22 wherein the base is an alkali metal base.

24. The process of claim 23 wherein the alkali metal base is an alkali metal hydroxide.

25. The process of claim 24 wherein the alkali metal hydroxide is sodium hydroxide.

26. The process of claim 21 wherein the solution contains an acid and has the pH which is between about 3 and 6.

27. The process of claim 26 wherein the acid is acetic acid.

28. The process of claim 29 wherein the centrifuging is at between about 1,000 and 30,000 times gravity.

29. The process of claim 21 wherein the plasticizer is a polyhydric alcohol.

30. The process of claim 29 wherein the polyhydric alcohol is glycerol.

31. The process of claim 21 wherein in step (c) the solution is removed by being decanted from the starch.

32. The process of claim 21 wherein the protein in step (d) is treated with a reducing agent.

33. The process of claim 32 wherein the reducing agent is selected from the group consisting of cysteine, sulfur dioxide and sodium bisulfite.

\* \* \* \* \*